United States Patent
Monsere

(10) Patent No.: US 9,308,831 B2
(45) Date of Patent: Apr. 12, 2016

(54) SYSTEM AND METHOD FOR CONTROLLING VEHICLE CREEP TORQUE

(75) Inventor: Patrick J. Monsere, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 106 days.

(21) Appl. No.: 13/458,436

(22) Filed: Apr. 27, 2012

(65) Prior Publication Data

US 2013/0288855 A1    Oct. 31, 2013

(51) Int. Cl.
*B60T 8/32* (2006.01)
*B60L 15/20* (2006.01)
*B60W 30/18* (2012.01)
*B60W 20/00* (2006.01)

(52) U.S. Cl.
CPC ......... *B60L 15/2045* (2013.01); *B60L 15/2063* (2013.01); *B60W 30/18063* (2013.01); *B60W 20/00* (2013.01); *B60W 2520/10* (2013.01); *B60W 2540/12* (2013.01); *B60W 2710/083* (2013.01); *Y02T 10/7283* (2013.01); *Y10T 477/37* (2015.01)

(58) Field of Classification Search
CPC ........... B60L 15/2045; B69L 15/2063; B60W 30/18063; B60W 2540/12; B60W 20/00; B60W 2520/10; B60W 2710/083; Y10T 477/37
USPC ........ 303/191, 192; 477/184, 185, 186, 93, 4; 701/22, 70, 93
See application file for complete search history.

(56) References Cited

U.S. PATENT DOCUMENTS

| | | | |
|---|---|---|---|
| 6,278,916 B1 * | 8/2001 | Crombez | 701/22 |
| 7,035,727 B2 * | 4/2006 | De La Salle et al. | 701/93 |
| 7,291,090 B2 * | 11/2007 | Ueno | 477/4 |
| 7,909,730 B2 * | 3/2011 | Schwarz et al. | 477/93 |
| 8,007,057 B2 * | 8/2011 | Niessen | 303/191 |
| 8,439,795 B2 * | 5/2013 | Miyamoto et al. | 477/27 |
| 2009/0112432 A1 * | 4/2009 | Ueoka et al. | 701/70 |
| 2009/0240411 A1 * | 9/2009 | Amamiya et al. | 701/70 |
| 2009/0305844 A1 * | 12/2009 | Klump | 477/71 |
| 2010/0004809 A1 * | 1/2010 | Itoh | 701/22 |
| 2012/0100958 A1 * | 4/2012 | Oue et al. | 477/21 |
| 2012/0150384 A1 * | 6/2012 | Jung et al. | 701/31.1 |

FOREIGN PATENT DOCUMENTS

| | | |
|---|---|---|
| EP | 2431243 A1 | 3/2012 |
| EP | 2431243 B1 | 3/2013 |
| JP | 2006050811 A * | 2/2006 |

OTHER PUBLICATIONS

References in Chinese Office Action for Application No. 201310149667.3, dated Jan. 22, 2015, 9 pages.

* cited by examiner

*Primary Examiner* — Thomas J Williams
*Assistant Examiner* — Mariano Sy
(74) *Attorney, Agent, or Firm* — Reising Ethington, P.C.; Lionel D. Anderson

(57) ABSTRACT

A system and method for controlling creep torque in a vehicle with an electric powertrain, like a hybrid electric vehicle (HEV). The method uses a combination of driver braking intent and other vehicle conditions, such as vehicle speed, to determine when creep torque is not needed and to reduce and/or cancel it accordingly. By reducing and/or cancelling the creep torque during periods where energy is being unnecessarily expended by the electric powertrain in order to work against the brakes, the present method is able to improve the overall efficiency of the vehicle.

15 Claims, 2 Drawing Sheets

SYSTEM AND METHOD FOR CONTROLLING VEHICLE CREEP TORQUE

FIELD

Figure 1:
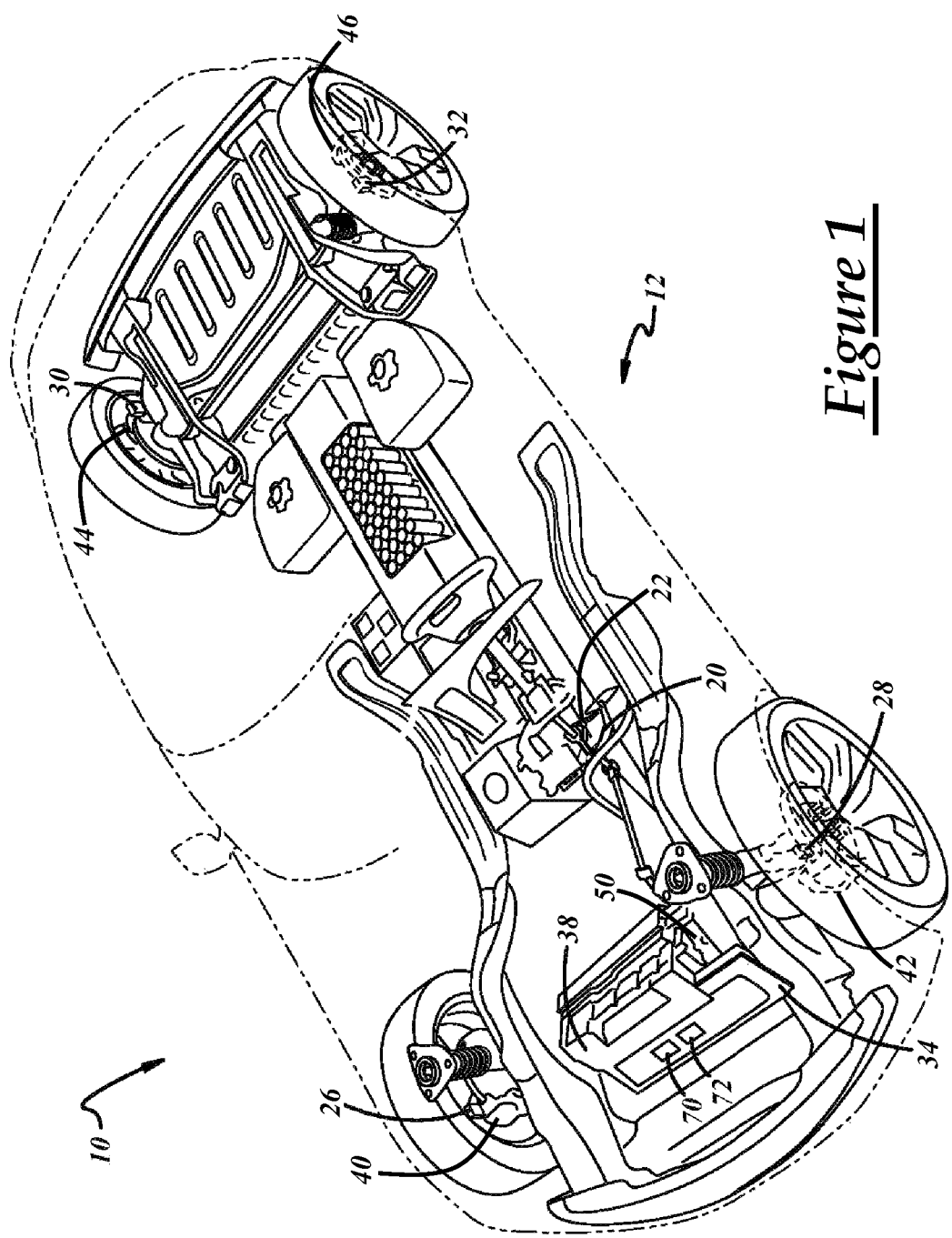

The present invention generally relates to vehicles with an electric powertrain and, more particularly, to a system and method that reduces energy consumption in such vehicles by controlling creep torque.

BACKGROUND

Most vehicles with a conventional powertrain are designed to accelerate slowly from a stopped position when they are idling in gear and the driver releases the brake pedal. The torque that causes this slow acceleration is provided by the powertrain and is sometimes referred to as "creep torque," as it generally causes the vehicle to creep forward from a stopped position, even when the driver is not engaging the accelerator pedal. If the vehicle is at a traffic light, for example, the driver can overcome the creep torque and maintain the vehicle in a stationary position by engaging the brakes. When the brake torque exerted by the vehicle brakes exceeds the creep torque supplied by the powertrain, the vehicle remains stationary; when the creep torque exceeds the brake torque, the vehicle moves forward.

Providing creep torque in a vehicle with a conventional powertrain—for example, one having an internal combustion engine, an automatic transmission and a torque converter—is relatively easy since the internal combustion engine is usually idling, even when the vehicle is stationary. Vehicles with electric powertrains, however, do not operate in the same manner. In order to simulate the driving experience of a traditional vehicle, hybrid electric vehicles (HEVs) and other vehicles with electric powertrains sometimes supply a creep torque that mimics that of a conventional powertrain. However, supplying creep torque in an electric powertrain without any control mechanisms in place can unnecessarily consume energy and reduce the overall efficiency of the vehicle.

SUMMARY

According to one embodiment, there is provided a method for controlling creep torque in a vehicle with an electric powertrain. The method may comprise the steps of: (a) gathering brake signals from a brake sensor and speed signals from one or more speed sensor(s); (b) using the brake signals and the speed signals to determine when the creep torque should be reduced; and (c) when it is determined that the creep torque should be reduced, then reducing the creep torque.

According to another embodiment, there is provided a method for controlling creep torque in a vehicle with an electric powertrain. The method may comprise the steps of: (a) gathering one or more vehicle condition(s); (b) using the vehicle condition(s) to determine when the creep torque should be reduced; and (c) when it is determined that the creep torque should be reduced, then manipulating a requested brake torque from the driver so that a manipulated brake torque is created that causes a reduction of the creep torque.

According to another embodiment, there is provided a system for controlling creep torque in a vehicle with an electric powertrain. The system may comprise a brake sensor providing brake signals; one or more speed sensor(s) providing speed signals; and a control unit coupled to the brake sensor and the speed sensor(s). The control unit is arranged to use the brake signals and the speed signals to determine when the creep torque should be reduced.

DRAWINGS

Figure 2:
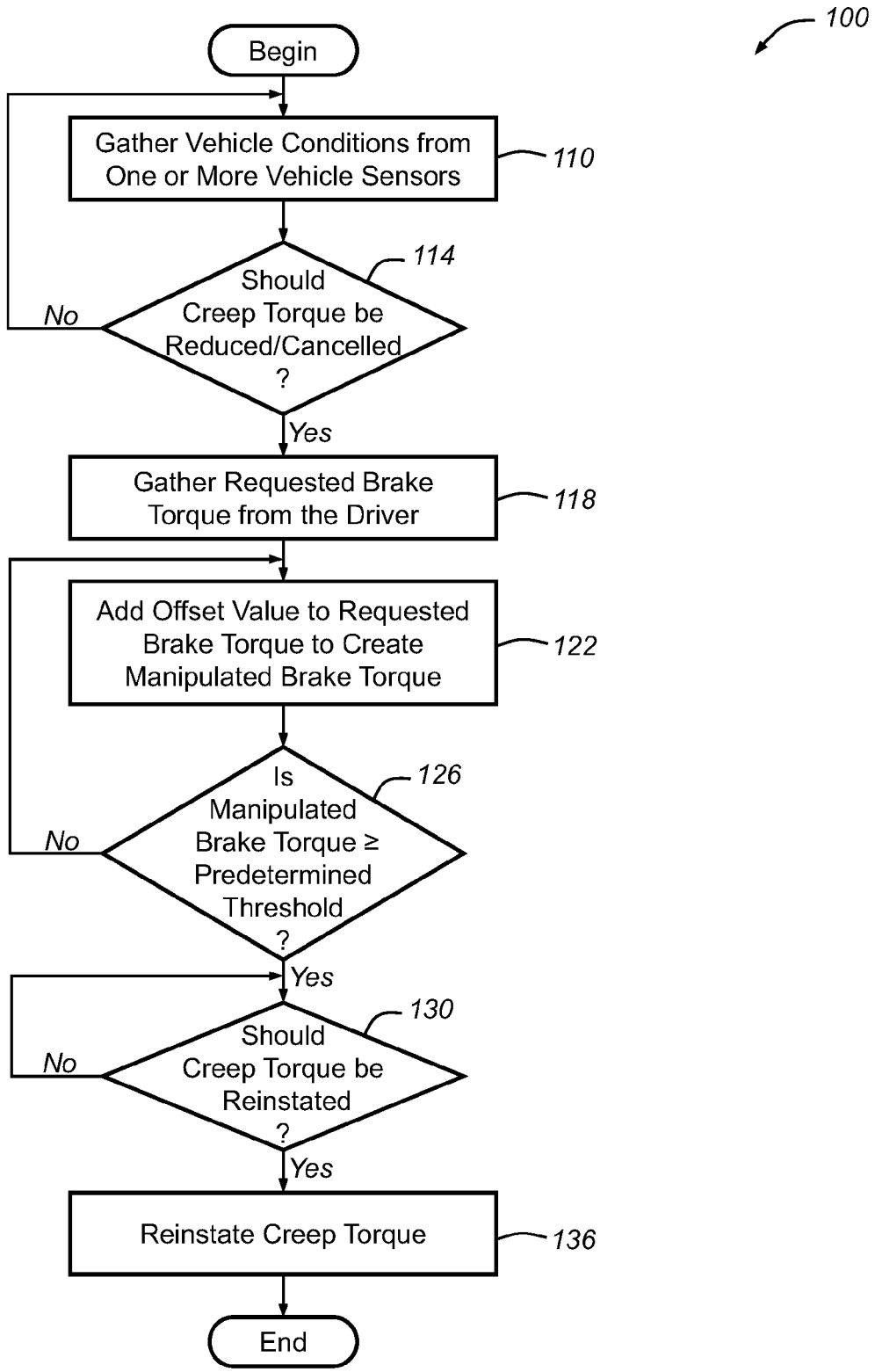

Preferred exemplary embodiments will hereinafter be described in conjunction with the appended drawings, wherein like designations denote like elements, and wherein:

FIG. 1 is a perspective view of an exemplary hybrid electric vehicle (HEV) that includes an electric powertrain with a control system for controlling creep torque; and FIG. 2 is a flowchart illustrating some of the steps of an exemplary method for controlling creep torque in a vehicle, such as the one shown in FIG. 1.

DESCRIPTION

The system and method described herein may be used to control creep torque in vehicles having an electric powertrain, such as hybrid electric vehicles (HEVs), plug-in hybrid electric vehicles (PHEVs), extended-range electric vehicles (EREVs), battery electric vehicles (BEVs), and others. In some electric powertrain systems, the creep torque is solely related to the braking intent of the driver, as represented by his or her engagement of the brake pedal. For example, if the vehicle is stationary and the driver lets out the brake pedal, such a system may increase the creep torque in order to fulfill what the system interprets as a driver request to slowly accelerate the vehicle. In this type of system—which relies exclusively on driver braking intent to control creep torque—there may be intermediate or transitional periods where the vehicle is simultaneously providing creep torque from a powertrain and counteracting brake torque from a brake system. These opposing torques consume energy while they resist one another and can reduce the overall efficiency of the vehicle. Thus, the present system and method interprets the braking intent of the driver in conjunction with other vehicle conditions, like vehicle speed and how long the vehicle has been stationary, in order to more efficiently control the creep torque and determine when it should be cancelled and/or initiated.

With reference to FIG. 1, there are shown portions of an exemplary hybrid electric vehicle (HEV) 10 having a control system 12 that may be used to efficiently control or manage creep torque. It should be appreciated that FIG. 1 is only a schematic representation of one potential vehicle and control system, and that the method described herein could be used with any number of different vehicles and systems and is not limited to the exemplary ones shown here. According to this particular embodiment, control system 12 generally includes brake sensor 20, accelerator sensor 22, speed sensors 26-32, control unit 34, engine 38, braking devices 40-46, and motor unit 50.

Any number of different sensors, components, devices, modules, sub-systems, systems, etc. may provide control system 12 with information or input that can be used with the present method. These include, for example, the exemplary sensors shown in FIG. 1, as well as others that are known in the art but are not shown here. It should be appreciated that brake sensor 20, accelerator sensor 22, speed sensors 26-32, as well as any other sensor used by control system 12 may be embodied in hardware, software, firmware, or some combination thereof. These sensors may directly sense or evaluate the conditions for which they are provided, or they may indirectly evaluate such conditions based on information provided by other sensors, components, devices, modules, sub-systems, systems, etc. Furthermore, these sensors may be directly coupled to control unit 34, indirectly coupled via other electronic devices, coupled over a vehicle communications bus, network, etc., or coupled according to some other arrangement known in the art. In addition, these sensors may be integrated within some other vehicle component, device, module, sub-system, system, etc. (e.g., sensors provided within an engine control module, an anti-lock braking system (ABS), etc.), they may be stand-alone components (as schematically shown in FIG. 1), or they may be provided according to some other arrangement. In some instances, multiple sensors might be employed to sense a single parameter (e.g., as a means for providing redundancy for the purpose of improving control and/or diagnostic robustness). These are only some of the possibilities, as any type of suitable sensor or sensor arrangement known in the art could be used.

Brake sensor 20 provides control system 12 with a brake signal that is representative of the position, movement, exerted force and/or state of the brake pedal. Thus, the brake signal is generally representative of the driver braking intent. Any number of different types of brake sensors may be used; these include non-contact-type sensors (e.g., optical sensors, electro-magnetic sensors, etc.), contact-type sensors (e.g., potentiometers, contact switches, etc.), as well as those that measure the force that the driver exerts against the brake pedal, to name a few. In a brake-by-wire application, brake sensor 20 may be integrated with a brake pedal simulator or emulator that conveys the expected mechanical feel of the brake pedal to the driver, as well as provides a brake signal.

Accelerator sensor 22 provides control system 12 with an accelerator signal that is representative of the position, movement, exerted force and/or state of the accelerator pedal. Thus, the accelerator signal is generally representative of the driver accelerating intent. As with the brake sensor above, any number of different types of accelerator sensors could be used; these include non-contact-type sensors (e.g., optical sensors, electro-magnetic sensors, etc.), contact-type sensors (e.g., potentiometers, contact switches, etc.), as well as those that measure the force that the drive exerts against the accelerator pedal, to name a few. In an exemplary embodiment, brake sensor 20 and/or accelerator sensor 22 use a non-contact-type sensor with a Hall-Effect element that is operably coupled to the corresponding pedal. In a drive-by-wire application, accelerator sensor 22 may be integrated with an accelerator pedal simulator or emulator that conveys the expected mechanical feel of the accelerator pedal to the driver, as well as provides an accelerator signal.

Speed sensors 26-32 provide control system 12 with speed signals that are indicative of the rotational speed or velocity of the wheels, and hence the overall velocity of the vehicle. A variety of different speed sensors and sensing techniques may be used, including those that use rotational wheel speed, ground speed, accelerator pedal position, clutch pedal position, gear shifter selection, vehicle acceleration, engine speed, engine torque and/or throttle valve position, to name a few. In one embodiment, individual wheel speed sensors 26-32 are coupled to each of the vehicle's four wheels and separately report the rotational velocity of the different wheels. Skilled artisans will appreciate that these sensors may operate according to optical, electromagnetic or other technologies, and that speed sensors 26-32 are not limited to any particular sensor type. In another embodiment, speed sensors could be coupled to certain parts of the vehicle, such as an output shaft of the transmission or behind the speedometer, and produce speed signals from these measurements. It is also possible to derive or calculate speed signals from acceleration signals, such as those mentioned above (skilled artisans appreciate the relationship between velocity and acceleration readings). In another embodiment, one or more speed sensors could determine vehicle speed relative to the ground by directing radar, laser or other signals towards the ground and analyzing the reflected signals, or by employing feedback from a Global Positioning System (GPS). It is possible for the speed signals to be provided to control system 12 by some other module, sub-system, system, etc., like an engine control module (ECM).

Control unit 34 may include any combination of electronic processing devices, memory devices, input/output (I/O) devices and/or other known components, and may perform various control- and communication-related functions. In an exemplary embodiment, control unit 34 includes an electronic memory device 70 and an electronic processing device 72 and is part of an engine control module (ECM), although this is not required as control unit 34 could be part of any number of other modules as well. Depending on the particular embodiment, control unit 34 may be a single standalone unit or module (e.g., a torque control module); it may be incorporated or included within a larger electronic module or system (e.g., an engine control module (ECM), a brake control module (BCM), a vehicle control integrated module (VCIM), a traction power inverter module (TPIM), a battery power inverter module (BPIM), a hybrid control module, etc.); or it may be part of a larger network or system, to cite a few possibilities. Some examples of such modules that may be particularly useful with exemplary system 12 include those that utilize drive-by-wire and brake-by-wire technologies.

Electronic memory device 70 may include any type of suitable electronic memory means and may store a variety of data, information and/or electronic instructions. This includes, for example, sensed vehicle conditions (e.g., those provided by sensors 20-32), look-up tables and other data structures, algorithms (e.g., electronic instructions used to implement the method described below), vehicle component characteristics and background information (e.g., operational settings or other parameters for the different vehicle components), etc. The method described below—as well as any combination of electronic instructions and information needed to perform such an algorithm—may be stored or otherwise maintained in electronic memory device 70.

Electronic processing device 72 may include any type of suitable electronic processor (e.g., a microprocessor, a microcontroller, an application specific integrated circuit (ASIC), etc.) that executes electronic instructions for software, firmware, programs, algorithms, scripts, etc. The exemplary processing device 72 is not limited to any one type of component or device. Control unit 34 may be electronically connected to other vehicle devices, modules, systems, etc. via a suitable connection and can interact with them as required. These are, of course, only some of the possible arrangements, functions and capabilities of control unit 34, as others are certainly possible.

Engine 38 may propel vehicle 10 using conventional internal combustion techniques and/or drive a generator, and can be any suitable type of engine known in the art. Some examples of suitable engines include gasoline, diesel, ethanol, flex-fuel, natural gas, liquefied petroleum gas (LPG), hydrogen, naturally aspirated, direct-inject, turbo-charged, super-charged, rotary, Otto-cycle, Atkins-cycle and Miller-cycle engines, as well as others. According to the exemplary embodiment shown here, engine 38 is a small fuel-efficient engine (e.g., a small displacement, turbo-charged four-cylinder engine) that uses the mechanical output of the engine to turn a generator for creating electrical energy. Skilled artisans will appreciate that engine 38 may be provided according to any number of different embodiments (e.g., the engine could be part of a parallel hybrid system where the engine is mechanically coupled to the vehicle wheels instead of a series hybrid system where it is used to drive a generator). It is also possible for vehicle 10 to have a fuel cell stack or some other source of electrical energy for vehicle propulsion that is used in lieu of or in addition to engine 38 and/or a battery pack.

Braking devices 40-46 may be a part of any suitable vehicle brake system, including systems that use disc brakes, drum brakes, electro-hydraulic braking, electro-mechanical braking, regenerative braking, brake-by-wire, etc. In an exemplary embodiment, each of the braking devices 40-46 is a disc brake assembly and includes a rotor, a caliper, a piston and brake pads (not shown) and may be part of an electro-hydraulic braking (EHB) system. As is appreciated by skilled artisans, a brake caliper straddles a rotor and carries a brake piston so that a compressive and frictional brake force can be applied by brake pads to opposing sides of the rotor during a braking event. The frictional brake force slows the rotation of the rotor and hence the rotation of a tire-wheel assembly and ultimately the vehicle. The brake pistons of each of the different braking devices 40-46 may be: all controlled in unison, controlled on a wheel-by-wheel basis, controlled in groups (e.g., the front wheels are controlled separately from the rear wheels), or controlled according to some other known method. Again, it should be appreciated that the preceding description of braking devices 40-46 is only provided for purposes of illustration. The method described herein may be used with any number of different braking devices including those found in electro-mechanical braking systems (EMB) or other brake-by-wire systems. For instance, braking devices 40-46 could be substituted with electro-mechanical brakes having electric calipers (e-calipers), drum brakes, or hybrid brakes that use regenerative braking.

Motor unit 50 is part of the electric powertrain of the vehicle and uses electrical energy stored in a vehicle battery to propel vehicle 10. Motor unit 50 may simply include a motor for generating a positive torque (acceleration) or it may include both a motor and a generator (a so-called "mogen") for generating both positive torque (acceleration) and negative torque (braking). A combined motor/generator can both propel the vehicle and slow the vehicle down through regenerative braking, which also generates electrical energy for charging the vehicle battery. Other motor and/or generator embodiments and arrangements are also possible. For example, the motor and generator could be split and provided as two separate devices, or multiple motor units could be provided on a per-axle-basis or a per-wheel-basis (e.g., separate motors at each wheel), to cite a few possibilities. Motor unit 50 can include an AC motor (e.g., a three phase AC induction motor), a DC motor, a brushed or brushless motor, a permanent magnet motor, etc., and may include a variety of components, like cooling features, sensors, control units and/or any other suitable components known in the art. When conditions are right, motor unit 50 receives electronic instructions or commands from control unit 34 that cause the motor unit to provide creep torque using electric energy stored in a high-voltage battery.

Again, the preceding description of FIG. 1 is only intended to illustrate one potential embodiment and the method described below is not confined to use with only that system. Any number of other system arrangements, combinations and/or architectures, including those that differ significantly from the one shown in FIG. 1, may be used instead.

Turning now to FIG. 2, there is shown an exemplary method 100 for controlling creep torque in a vehicle with an electric powertrain, like hybrid electric vehicle (HEV) 10. Method 100 uses a combination of driver braking intent and other vehicle conditions, such as vehicle speed and how long the vehicle has been stationary, to determine when creep torque is not needed and to reduce and/or cancel it accordingly. By reducing and/or cancelling creep torque during intermediate periods where energy is being unnecessarily expended by the electric powertrain in order to work against the brakes, the present method is able to improve the overall efficiency of the vehicle. In some cases, this may reduce the vehicle's energy consumption by 200-400 W, depending on the vehicle. The phrase "reducing creep torque," including its various verb, adjective and other forms, broadly includes decreasing, cancelling, disengaging, deactivating and/or otherwise reducing the creep torque provided by an electric powertrain. Any number of different techniques and approaches may be used to implement the present method, including the exemplary embodiment illustrated in FIG. 2 and described below. The following description of method 100 assumes that a creep torque feature has already been activated or initiated and instead focuses on techniques for reducing and/or reinstating such a feature.

Beginning with step 110, the method gathers one or more vehicle conditions from around the vehicle. Generally speaking, this step gathers vehicle conditions in an effort to better interpret or determine the intentions of the driver so that creep torque can be disengaged at the appropriate time. For instance, if a brake signal indicates that the driver is currently letting up on the brake pedal, then this may signal that the driver wishes for the vehicle to start moving forward and some amount of creep torque is therefore needed. Conversely, if the brake signal shows that the brake pedal is fully depressed and the speed signals indicate that the vehicle has been stationary for some time, then this may suggest that the driver does not want the vehicle to move forward and a reduction of the creep torque is appropriate. In a non-limiting example of step 110, control unit 34 gathers brake signals from brake sensor 20 and speed signals from speed sensors 26-32. Other vehicle conditions, however, may also be gathered including accelerator signals from accelerator sensor 22 and/or sensor signals indicating the status of a drive axle, clutch pedal, gear shifter, engine, throttle valve, etc. As explained above in more detail, these vehicle conditions may be gathered or otherwise obtained directly from the sensors, indirectly via other components, devices, modules, systems, etc., by calculation or derivation, or in some other suitable manner. In addition, the signals carrying these vehicle conditions may be filtered, converted and/or otherwise processed before being evaluated and used by the method.

Step 114 evaluates the vehicle conditions from the previous step and determines if the creep torque should be reduced. This evaluation may consider any number of different vehicle conditions and may be performed in a variety of ways. According to an exemplary embodiment, step 114 uses the brake signals from the previous step to compare a requested brake torque to a minimum brake threshold, and it uses the speed signals from the previous step to compare a current vehicle speed to a maximum speed threshold. If step 114 only considered the requested brake torque from the driver and not other vehicle conditions like vehicle speed, for example, the method may miss opportunities to reduce creep torque in situations where it is not needed and, thus, unnecessarily expend energy that reduces vehicle efficiency. Consider the example where vehicle 10 is stopped at a stop light, the vehicle is located on a slight incline, and the driver is lightly engaging the brakes such that the vehicle has been stationary at the light for at least several seconds (the combination of lightly engaging the brakes plus the incline cause the vehicle to be stationary). In this scenario, it is possible that the requested brake torque, as represented by the brake signals, is less than the minimum brake threshold even though the driver does not wish for the vehicle to creep forward. This is an example of when it may be beneficial to consider both requested brake torque and vehicle speed when determining the current need for creep torque—a vehicle speed of zero for several seconds in a row, in combination with brake engagement, likely indicates that the driver does not currently want any creep torque. Generally speaking, step 114 attempts to determine when creep torque can be appropriately reduced by using a combination of vehicle conditions. Other factors, like the duration of such vehicle conditions, could certainly be used as well.

In one embodiment, step 114 may require that both the minimum brake threshold and the maximum speed threshold be satisfied before reducing the creep torque. For example, if a driver requested brake torque of 264 N·m is greater than or equal to a minimum brake threshold of 250 N·m (condition satisfied), but a current vehicle speed of 1 m/sec is not less than a maximum vehicle speed of 0 m/sec (condition not satisfied), then step 114 may determine that the driver is purposely causing the vehicle to roll forward and that the creep torque should be maintained. In a different embodiment, step 114 may employ a sliding scale such that only one of the thresholds needs to be satisfied so long as the other threshold is satisfied by a significant predetermined margin. The minimum brake threshold and maximum speed threshold can be predetermined and independent of one another, or they may be linked to one another such that one is dependent on the other (e.g., when one threshold is raised, the other is lowered). It is also possible for step 114 to employ a time component for the different evaluations that is performs. For example, it may be required that the requested brake torque exceed the minimum brake threshold or that the current vehicle speed be less than the maximum speed threshold for a certain amount of time (e.g., 0.5, 1, 2 sec, etc.), as opposed to satisfying these thresholds instantaneously. This step is not limited to evaluating requested brake torque and vehicle speed, as other vehicle conditions like requested acceleration and axle torque may be considered as well. If step 114 determines that the creep torque should be reduced, then method 100 proceeds to the next step; otherwise, the method loops back for further monitoring.

Steps 118-126 engage in a process of reducing the creep torque provided by the electric powertrain, and may do so according to several different methods. As stated above, the phrase "reducing creep torque" could include a simple reduction of the creep torque, an outright cancellation of the creep torque, or some other diminishment of the creep torque provided by an electric powertrain. It is possible for one or more of these steps to simply send a command signal to engine control module 34 or the like instructing it to reduce the creep torque; such an approach may use any suitable techniques known in the art. In a different example that is illustrated by steps 118-126, the method artificially manipulates the requested brake torque from the driver until the point where a manipulated brake torque causes the creep torque to be disengaged, etc. Those skilled in the art will appreciate that some vehicles with electric powertrains only disengage creep torque when the requested brake torque exceeds some predetermined threshold (e.g., 300 N·m). Steps 118-126 enable the present method to be used with this type of system without having to modify all of the system software (i.e., method 100 could act as a retrofit or modification to an existing creep torque system). Once the method determines that the creep torque should be reduced, steps 118-126 synthetically increment the requested brake torque (even though the driver is not actually requesting any additional braking) until the artificially manipulated brake torque exceeds the predetermined threshold of the existing system. In this way, steps 118-126 increase the brake torque and in doing so "trick" or "deceive" an engine control module or other device into believing that the creep torque should be disengaged, even though the system's single criteria has not actually been satisfied. Modifying an existing creep torque system with these steps will likely result in a greater number of creep torque reductions and, thus, the vehicle will use less energy and operate more efficiently.

The preceding description only pertains to one example of how to reduce creep torque, as steps 118-126 are optional and could be replaced with other approaches like sending a creep torque cancellation command signal, for example. If these optional steps are implemented, step 118 gathers and records the actual requested brake torque from the driver otherwise referred to as the driver braking intent (e.g., 264 N·m in the example above), step 122 adds an offset value (e.g., 20 N·m) to this value so that a manipulated brake torque value is created (e.g., 264 N·m+20 N·m=284 N·m), and step 126 determines if the manipulated brake torque value is greater than or equal to the predetermined threshold of the existing system (284 N·m is <300 N·m; condition not satisfied). If the manipulated brake torque fulfills or satisfies the predetermined threshold requirements, then the method may proceed to the next step; if not, then the method loops around for another iteration so that step 122 can further increment or increase the manipulated brake torque by the offset value (e.g., 284 N·m+20 N·m=304 N·m; condition satisfied). All along, the system believes that the requested brake torque is being increasing by the driver and is increasing the brake torque out at braking devices 40-46, accordingly. It should be appreciated that step 122 may increase, decrease or otherwise modify the manipulated brake torque (it is not necessary that it only be incremented by a predetermined offset value), and that it could modify the manipulated brake value all in a single step or do so according to a series of incremental steps, to cite a few possibilities.

Typically, reductions and/or cancellations in creep torque are temporary; that is, they are not intended to permanently disable or disengage the creep torque feature as there will probably be instances in the future where creep torque is again needed. For example, if the vehicle is at a stop light where the creep torque was previously cancelled but now the light has changed, the driver will probably want to start accelerating when they remove their foot from the brake pedal. Step 130 monitors one or more vehicle conditions to determine if the creep torque needs to be reinstated. The vehicle conditions that are monitored or otherwise used in this step may be the same or similar to those employed above (e.g., requested brake torque and vehicle speed), or they may be different. In one embodiment, step 130 compares the requested brake torque currently being provided by the driver via brake sensor 20 (e.g., 198 N·m) to a reinstatement threshold (e.g., 214 N·m). When the requested brake torque is less than or equal to the reinstatement threshold (suggesting that the driver may want to start moving the vehicle forward), then the method may proceed with reinstating the creep torque (e.g., 198 N·m is <214 N·m; condition satisfied); if the requested brake torque is greater than or equal to the reinstatement threshold, then the method does not reinstate the creep torque. In one embodiment, the reinstatement threshold is equal to the requested brake torque that was gathered and stored in step 118, minus some value to take hysteresis into account (e.g., 264 N·m−50 N·m=214 N·m). The hysteresis is designed to address momentarily fluctuations in the requested brake torque values. If step 130 determines that the creep torque should be reinstated, then the method proceeds to step 136; otherwise, the method loops back and keeps monitoring for creep torque reinstatement conditions.

Step 136 reinstates the creep torque, and may do so gradually, all at once, or according to some other technique. For example, step 136 may compare the current requested brake torque value from the driver (e.g., 198 N·m) to a full reinstatement threshold (e.g., 164 N·m) that is based off of the requested brake torque value gathered and stored in step 118 (e.g., 264 N·m−100 N·m=164 N·m). If the current requested brake torque is greater than the full reinstatement threshold, which it is in the example above, then step 136 will assume that the driver is still engaging the brakes and will reinstate the creep torque by gradually reducing the manipulated brake torque value. One way to do this is to incrementally subtract an offset value (e.g., 20 N·m) from the manipulated brake torque value; such a process would gradually "undo" the artificial increases that were previously made to the manipulated brake torque in step 122 (e.g., after a first iteration the manipulated brake torque would be 304 N·m−20 N·m=284 N·m, after a second iteration it would be 264 N·m, and so on). Once the manipulated brake torque is less than or equal to the full reinstatement threshold (e.g., 164 N·m), the manipulated brake torque would simply be set to the actual brake torque currently being requested by the driver. It should be appreciated that the full reinstatement threshold is less than the reinstatement threshold.

In another embodiment, if the current requested brake torque is already less than the full reinstatement threshold (thus, signaling that the driver is releasing the brake pedal in an effort to accelerate the vehicle), then step 136 may fully reinstate the creep torque by setting the manipulated brake torque to the current requested brake torque. As the driver releases the brakes, there could be a handoff from a brake control module (BCM) to an engine control module (ECM) so that the vehicle starts to move forward; such a process could be facilitated by control unit 34 sending out command signals to the appropriate destinations. It should be appreciated that in the non-limiting examples above, both the reinstatement threshold and the full reinstatement threshold are pegged to the requested brake torque value previously recorded in step 118. Moreover, it should be appreciated that the manipulated brake torque value is the value that is actually used by the brake control module to control braking devices 40-46 and is the value that is provided to the engine control module to determine when to reduce the creep torque. Other embodiments, values, thresholds, techniques, etc. may be used instead, as the preceding description is of only one potential embodiment.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for controlling creep torque in a vehicle with an electric powertrain, comprising the steps of:
   a) gathering brake signals from a brake sensor and speed signals from one or more speed sensor(s);
   b) using the brake signals to compare a requested brake torque to a minimum brake threshold and using the speed signals to compare a current vehicle speed to a maximum speed threshold, wherein the current vehicle speed must be less than or equal to the maximum speed threshold for a certain amount of time in order to determine when the creep torque should be reduced;
   c) when it is determined that the creep torque should be reduced, then reducing the creep torque;
   d) continuing to monitor the brake signals from the brake sensor and using the brake signals to compare another requested brake torque to a reinstatement threshold to determine when the creep torque should be reinstated; and
   e) reinstating the creep torque when the requested brake torque is less than or equal to the reinstatement threshold.

2. The method of claim 1, wherein both the minimum brake threshold and the maximum speed threshold must be satisfied before step (b) will determine that the creep torque should be reduced.

3. The method of claim 1, wherein the requested brake torque must be greater than or equal to the minimum brake threshold for a certain amount of time before step (b) will determine that the creep torque should be reduced.

4. The method of claim 1, wherein step (c) further comprises reducing the creep torque by artificially manipulating a requested brake torque from the driver so that a manipulated brake torque satisfies a predetermined threshold that causes the reduction of the creep torque, even though an actual requested brake torque does not satisfy the predetermined threshold.

5. The method of claim 4, wherein step (c) further comprises gathering the requested brake torque from the driver, adding an offset value to the requested brake torque so that the manipulated brake torque is created, and determining if the manipulated brake torque is greater than or equal to the predetermined threshold.

6. The method of claim 1, wherein the reinstatement threshold is equal to a requested brake torque from the driver that was previously gathered and stored, minus a hysteresis value.

7. The method of claim 1, wherein step (d) further comprises comparing the requested brake torque provided by the driver to a full reinstatement threshold, and gradually reinstating the creep torque when the requested brake torque is greater than the full reinstatement threshold and fully reinstating the creep torque when the requested brake torque is less than or equal to the full reinstatement threshold.

8. A method for controlling creep torque in a vehicle with an electric powertrain, comprising the steps of:
   a) gathering one or more vehicle condition(s);

b) using the vehicle condition(s) to determine when the creep torque should be reduced; and c) when it is determined that the creep torque should be reduced, then artificially manipulating a requested brake torque from the driver so that a manipulated brake torque satisfies a predetermined threshold that causes a reduction of the creep torque, even though the actual requested brake torque does not satisfy the predetermined threshold.

9. The method of claim 8, wherein step (a) further comprises gathering brake signals from a brake sensor and speed signals from one or more speed sensor(s); and step (b) further comprises using the brake signals to compare a requested brake torque to a minimum brake threshold, and using the speed signals to compare a current vehicle speed to a maximum speed threshold.

10. The method of claim 8, wherein step (c) further comprises gathering the requested brake torque from the driver, adding an offset value to the requested brake torque so that the manipulated brake torque is created, and determining if the manipulated brake torque is greater than or equal to the predetermined threshold.

11. The method of claim 8, further comprising the step of:

(d) monitoring one or more vehicle condition(s) and using the vehicle condition(s) to determine when the creep torque should be reinstated.

12. The method of claim 11, wherein step (d) further comprises comparing a requested brake torque provided by the driver to a reinstatement threshold, and reinstating the creep torque when the requested brake torque is less than or equal to the reinstatement threshold.

13. The method of claim 12, wherein the reinstatement threshold is equal to a requested brake torque from the driver that was previously gathered and stored, minus a hysteresis value.

14. The method of claim 12, wherein step (d) further comprises comparing the requested brake torque provided by the driver to a full reinstatement threshold, and gradually reinstating the creep torque when the requested brake torque is greater than the full reinstatement threshold and fully reinstating the creep torque when the requested brake torque is less than or equal to the full reinstatement threshold.

15. A system for controlling creep torque in a vehicle with an electric powertrain, comprising:

a brake sensor providing brake signals;

one or more speed sensor(s) providing speed signals; and a control unit coupled to the brake sensor and the speed sensor(s), wherein the control unit is configured to gather vehicle conditions including the brake signals and the speed signals, to use the vehicle conditions to determine when the creep torque should be reduced, and when it is determined that the creep torque should be reduced, to artificially manipulate a requested brake torque from the driver so that a manipulated brake torque satisfies a predetermined threshold that causes a reduction of the creep torque, even though the actual requested brake torque does not satisfy the predetermined threshold.

\* \* \* \* \*